(12) United States Patent
Havelka et al.

(10) Patent No.: US 7,868,983 B2
(45) Date of Patent: Jan. 11, 2011

(54) ADVANCED LCD PACKAGING FOR MILITARY AND SEVERE ENVIRONMENTS

(75) Inventors: Steven E. Havelka, Los Angeles, CA (US); Ragini Saxena, Simi Valley, CA (US); Thomas Loo, Calabasas, CA (US); Thomas McLean, West Hills, CA (US); Ban S. Bong, Calabasas, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 851 days.

(21) Appl. No.: 11/777,117

(22) Filed: Jul. 12, 2007

(65) Prior Publication Data

US 2009/0015998 A1    Jan. 15, 2009

(51) Int. Cl.
G02F 1/1343 (2006.01)
H05K 5/02 (2006.01)

(52) U.S. Cl. ............ 349/140; 349/56; 349/61; 349/58; 349/64; 349/161; 361/681

(58) Field of Classification Search .......... 349/140, 349/56, 58, 61, 64, 65, 161, 110, 199; 361/681
See application file for complete search history.

(56) References Cited

U.S. PATENT DOCUMENTS

| 5,748,269 | A   | * | 5/1998  | Harris et al. .......... 349/58 |
|-----------|-----|---|---------|--------------------------------|
| 6,967,280 | B1  | * | 11/2005 | Boatwright et al. ...... 174/377 |
| 7,167,309 | B2  |   | 1/2007  | Saxena et al. ......... 359/586 |
| 7,173,678 | B2  | * | 2/2007  | Havelka et al. ......... 349/58 |
| 7,265,809 | B2  | * | 9/2007  | Dunn et al. ........... 349/161 |
| 7,292,291 | B2  | * | 11/2007 | Dunn et al. ........... 349/72 |
| 2005/0073642 | A1 | * | 4/2005  | Dunn et al. ........... 349/199 |
| 2005/0285990 | A1 | * | 12/2005 | Havelka et al. ......... 349/58 |
| 2009/0015998 | A1 | * | 1/2009  | Havelka et al. ........ 361/681 |
| 2010/0066936 | A1 | * | 3/2010  | Garrett et al. ......... 349/58 |

* cited by examiner

Primary Examiner—Brian M Healy

(57) ABSTRACT

The invention relates generally to a modular display panel for enclosing Commercial-Off-The-Shelf ("COTS") display technologies. More particularly, the invention relates to a modular display panel for housing COTS light emitting or transmitting display subassemblies such as Liquid Crystal Displays (LCD) for military and other severe environments. The modular display assembly can comprise a base plate, a first frame, a window, a second, a circuit located, and a plurality of light emitting diodes mounted on the circuit board. The COTS light emitting or transmitting display subassembly can be connected to the second frame.

19 Claims, 4 Drawing Sheets

ADVANCED LCD PACKAGING FOR MILITARY AND SEVERE ENVIRONMENTS

BACKGROUND OF THE INVENTION

1. Field of the Invention

The invention relates generally to a modular display panel for enclosing Commercial-Off-The-Shelf ("COTS") display technologies. More particularly, the invention relates to a modular display panel for housing COTS light emitting or transmitting display subassemblies such as Liquid Crystal Displays (LCD) for military and other severe environments.

2. Description of Related Art

Commercial-Off-The-Shelf ("COTS") light emitting or transmitting display subassemblies are often fragile and susceptible to damage during movement or exposure to any sort of unstable environment. While COTS light emitting or transmitting display subassemblies may be acceptable in non-severe environments such as in a personal home, or at an office, they may be unacceptable in other areas. For example, in the military, the equipment used must be able to withstand exposure to a variety of severe environments such as forceful impacts, debris filled air, electromagnetic radiation, etc.

However, to produce a COTS light emitting or transmitting display subassembly that can withstand exposure to a variety of harmful environments is often expensive. The usual options for the military are to produce the entire COTS light emitting or transmitting display subassembly themselves, which is undesirable due to the need for machinery and expertise in the display production, or to custom order a COTS light emitting or transmitting display subassembly, which is undesirable due to the costs required in redesigning the COTS light emitting or transmitting display subassembly. Thus, there is a need for an invention to allow COTS light emitting or transmitting display subassembly to operate in severe environments at a reasonable cost.

SUMMARY OF THE INVENTION

The present invention is a modular display assembly for housing a COTS light emitting or transmitting display subassembly such as a Liquid Crystal Displays ("LCD"). The modular display assembly has a base plate, a first frame with a first opening, the first frame attached to the base plate to form a cavity, and a window attached to the first frame at the first opening for enclosing the cavity. A second frame with a second opening is located in the cavity attached to the first frame. A circuit is located within the cavity adjacent the base plate. A plurality of light emitting diodes are mounted on the circuit board on the side facing the display sub assembly which is connected to the second frame.

The first frame is preferably made from a metal coated glass filled plastic making it electrically and thermally conductive, and relatively impact resistant. The base plate is also preferably electrically and thermally conductive, and relatively impact resistant. The window is preferably made of a glass layer, a conductive indium tin oxide layer, or may be made of materials such as those disclosed in Saxena et al. (U.S. Pat. No. 7,167,309), which is incorporated by reference as if fully set forth herein. The window is preferably electrically and thermally conductive, and could also be relatively impact resistant.

With the first frame, the window, and the base plate being electrically conductive, a Faraday cage is formed around the COTS light emitting or transmitting display subassembly. The Faraday cage protects the COTS light emitting or transmitting display subassembly from electromagnetic or other types of interference and the display assembly from emitting electromagnetic or other types of interference.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figure 1:
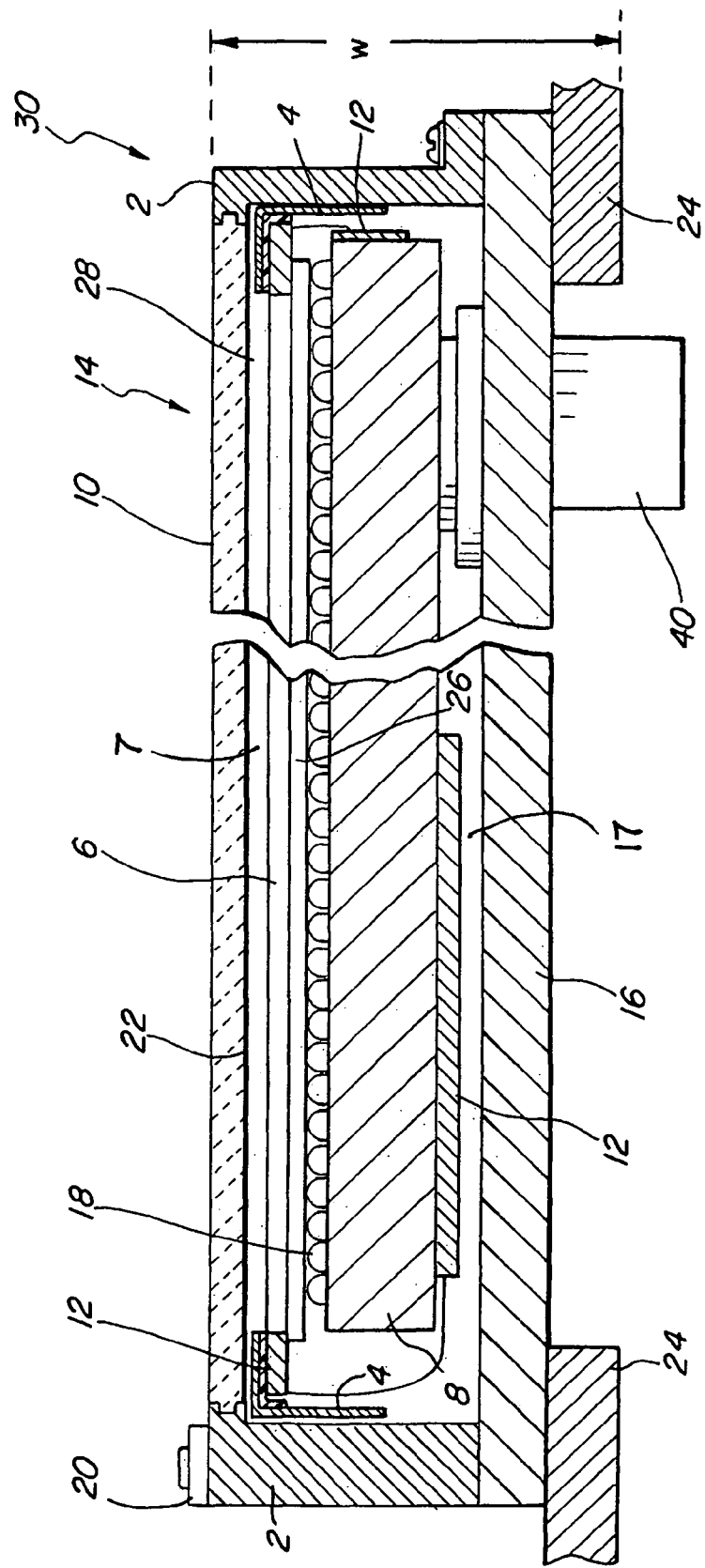
FIG. 1 is a side cross-section view of the present invention.

FIG. 1 is a side cross-section view of the present invention, a modular display assembly 30. As can be seen, the modular display assembly 30 has a first frame 2 with a first opening, a window 14, a second frame 4 with a second opening mounted within the first frame, a plurality of light emitting diodes 18 mounted on a circuit board 8 and a base plate 16. It is contemplated that by mounting the light emitting diodes 18 on the circuit board 8 instead of having them be two separate components, space and costs could be saved. By mounting the light emitting diodes 18 on the circuit board 8, space requirements are reduced, because there will be only one component instead of two. Thus, the width "w" of the modular display assembly 30 will be reduced. Furthermore, it will cost less to manufacture light emitting diodes 18 mounted on a circuit board 8 because there is only a need to produce one component instead of two separate components.

A COTS light emitting or transmitting display subassembly 6 such as a liquid crystal display is mounted to the second frame 4. As can be seen in FIG. 1, the first frame 2 is attached to the base plate 16 to form a cavity 28. A window 14 is attached to the first frame 2 at the first opening for enclosing the cavity 28.

The first frame 2 may be made of metal, glass, plastic, or a combination thereof, such as a metal coated glass filled plastic. The first frame 2 is preferably electrically and thermally conductive, and relatively impact resistant. The base plate 16 is also electrically and thermally conductive, and relatively impact resistant. The window 14 on the first frame 2 is preferably made of a glass layer 10. The window 14 could be made of other materials, such as those disclosed in Saxena et al. (U.S. Pat. No. 7,167,309). The window 14 is preferably electrically and thermally conductive, and relatively impact resistant. Adjacent the window 14 an indium tin oxide layer heater and electromagnetic interference (EMI) shield 22 may be located.

Because the first frame 2, the window 14, and the base plate 16 are electrically conductive, they form a Faraday cage around the COTS light emitting or transmitting display subassembly 6 which is attached to and contained within the second frame 4. This protects the COTS light emitting or transmitting display subassembly 6 from electromagnetic or other types of interference and the display assembly from emitting electromagnetic or other types of interference. Because the first frame 2, the base plate 16, the window 14 are relatively impact resistant, the structure will absorb shock and prevent damage to the COTS light emitting or transmitting display subassembly 6 mounted within second frame 6. Furthermore, the first frame 2, the window 14, and the base plate 16 are preferably sealed to protect the COTS light emitting or transmitting display subassembly 6 from the elements, such as humidity, salt fog, and harmful particles such as sand, rocks, debris, or dust.

Diffusers and/or film 26 could be located between the COTS light emitting or transmitting display subassembly 6 and the light emitting diodes 18. The present invention contemplates that drive electronics 12 for driving the COTS light emitting or transmitting display subassembly 6 is located in the cavity adjacent any one of the sides of the circuit board 8 adjacent to the base plate 6.

The base plate 16 works in conjunction with the first frame 2 and the window 14 to absorb shock and maintain the drive electronics 12, circuit board 8, light emitting diodes 18, diffusers and/or film 26, the COTS light emitting or transmitting display subassembly 6, second frame 4 relatively immobile during shock and vibration.

The second frame 4 is mounted to the first frame 2 so that a sway space 7 is left between the COTS 6 and the glass layer 10 and a sway space 17 is left between the bottom of the circuit board and the base plate 16. The second frame 4 works in conjunction with the first frame 2 and window 14 to maintain the drive electronics 12, circuit board 8, light emitting diodes 18, diffusers and/or film 26, and the COTS light emitting or transmitting display subassembly 6, all mounted to the second frame 4, in a relatively immobile state during shock and vibration.

The first frame 2 and the base plate 16 maintain the drive electronics 12, circuit board 8, light emitting diodes 18, diffusers and/or film 26, and the COTS light emitting or transmitting display subassembly 6 free from electromagnetic interference and the elements.

The present invention prevents the COTS light emitting or transmitting display subassembly 6 from being damaged by reducing the likelihood that the vital components contained within the modular display assembly 30, such as drive electronics 12, circuit board 8, light emitting diodes 18, diffusers and/or film 26, the COTS light emitting or transmitting display subassembly 6, contained in the second frame 4, mounted to the first frame 2, will move around in the cavity 28 during impact and vibration.

The modular display assembly is mounted, for example, on a customer bulkhead 24, such as on an airplane, a helicopter, a tank, a car, a boat, a bunker, for example.

The modular display assembly 30 preferably also has a bezel and controls 20 to allow a user to control the COTS light emitting or transmitting display subassembly 6, such as brightness and contrast. There could also be an optional connector and electromagnetic interference filter 40 connected to the base plate 16 and the circuit board 8.

Figure 2:
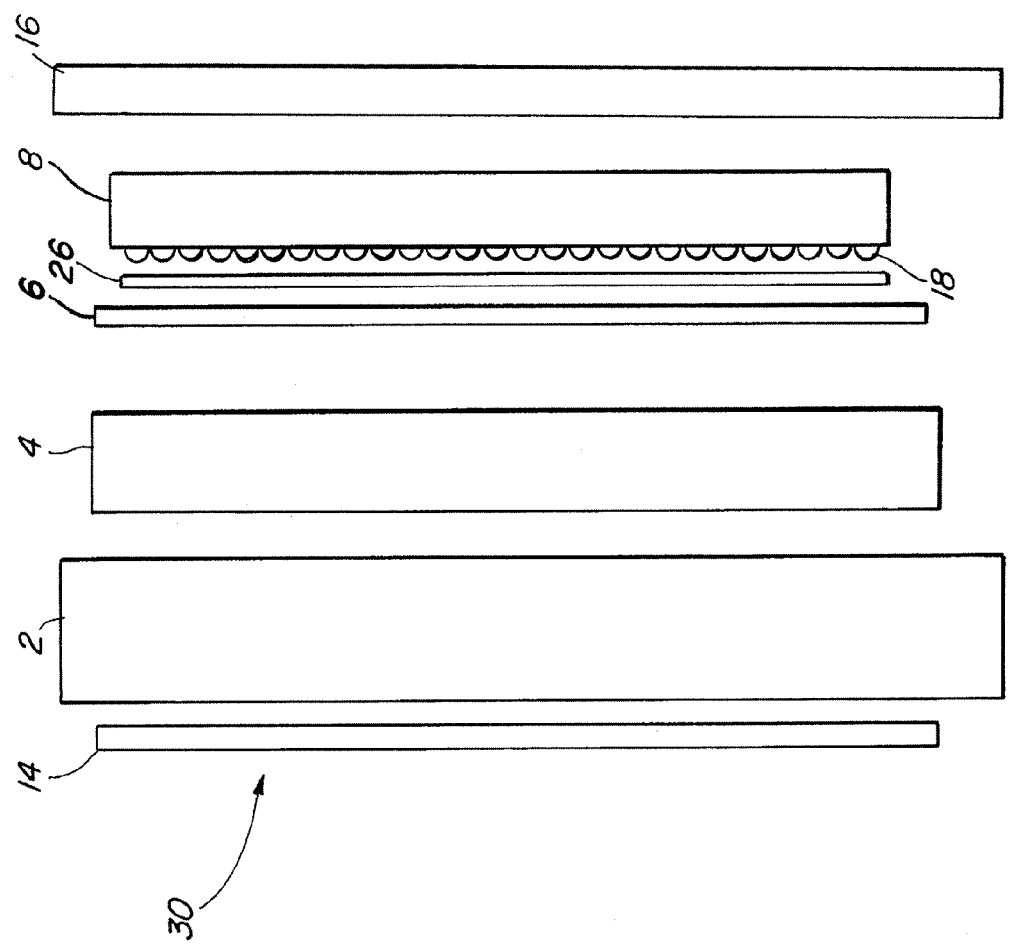
FIG. 2 is an exploded side view of the present invention.
Figure 3:
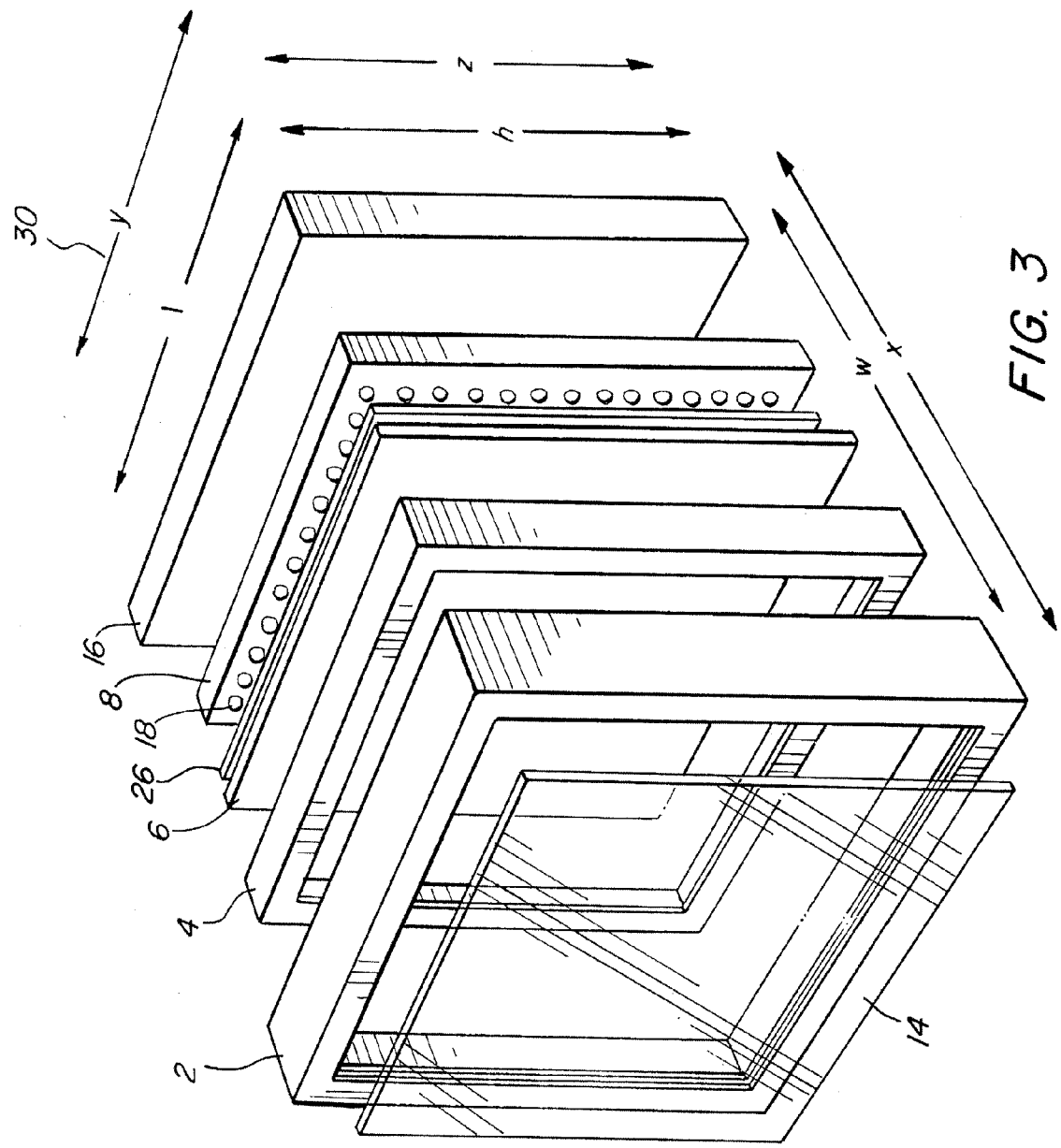
FIG. 3 is an exploded perspective view of the present invention.

FIG. 2 is an exploded side view of the present invention while FIG. 3 is an exploded perspective view of the present invention. As can be seen, the modular display assembly 30 has a window 14, a first frame 2, a second frame 4, diffusers and/or film 26, a COTS light emitting or transmitting display subassembly 6, a plurality of light emitting diodes 18 mounted on a circuit board 8, and a base plate 16 in a sandwich structure. As shown in FIG. 3, the modular display assembly 30 has a height "h," a length "l" and a width "w." The three axis of the display assembly 30 related to the dimensions by the x axis being parallel to the width "w," the z axis being parallel to the height "h," and the y axis being parallel to the length "l."

Figure 4:
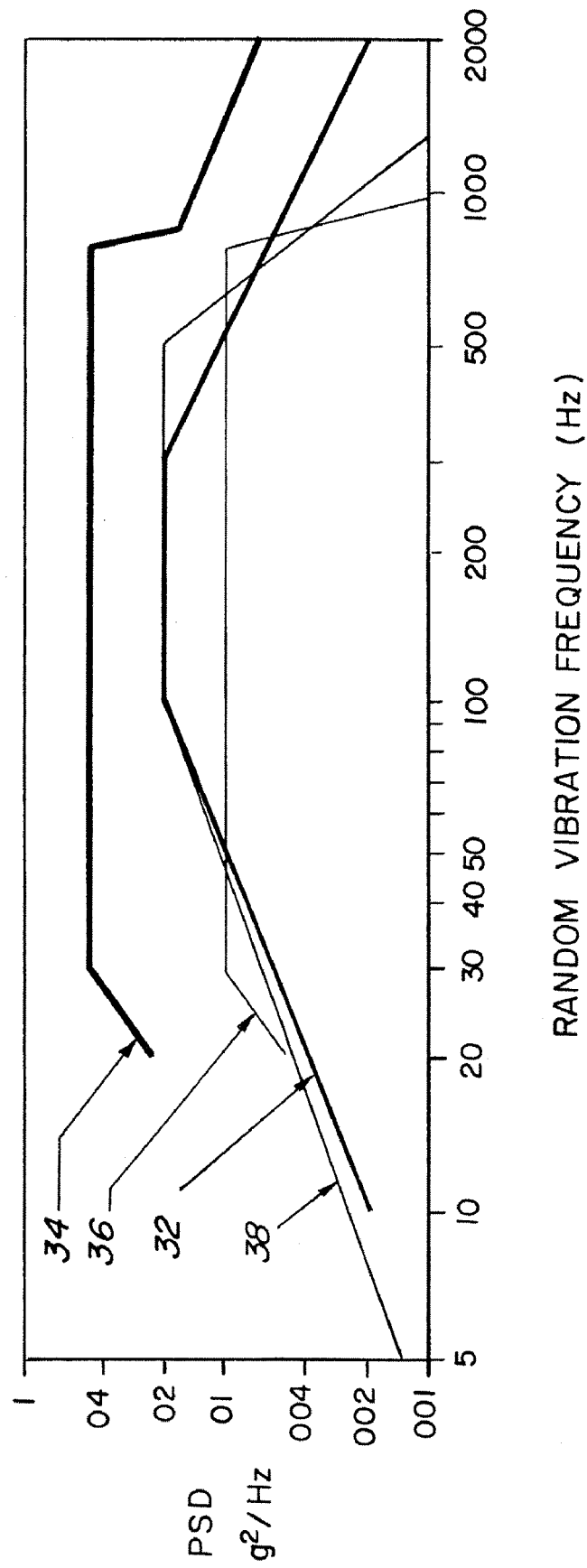
FIG. 4 is a chart detailing input for testing performed on the present invention.

FIG. 4 is a chart detailing input for testing successfully performed on two samples of the present invention. These samples of the present invention were tested for four hours, fully operational, on each axis x, y, and z with each axis x, y, and z in turn being parallel to the ground. For example, four hours of operational testing was done with the axis x parallel to the ground. Four hours of operational testing was done with the y axis parallel to the ground. Four operational hours of testing was done with the z axis parallel to the ground. Both samples of the present invention met all operational requirements, without damage, throughout the 12 total hours of testing.

In each of the 4 hours of testing for each axis, one hour was spent meeting the MIL-STD-810 vibration requirements of the H-1 Cobra Helicopter, including Gunfire Vibration 32, one hour was spent meeting the Endurance Vibration requirements of the E-2D Hawkeye carrier bound aircraft 34, one hour was spent meeting the Functional Vibration requirements of the E-2D Hawkeye carrier bound aircraft 36, and one hour was spent meeting the Endurance Vibration requirements of the MH-60 Helicopter 38.

As can be seen in FIG. 4, the chart summarizes and compares the random vibration requirement for the 3 avionics platforms, and presents frequency (Hz) vs. power spectral density (PSD) in $g^2/Hz$ where g is the force of gravity (approx. 9.80665 $m/s^2$ or approx. 32.174 $ft/s^2$) for each test that the present invention was subjected to. The present invention had no anomalies or performance issues such as flicker for the 4 hours of testing on each axis x, y, and z.

Furthermore, the two samples of the modular display assembly 30 were also subjected to 20 Functional Shocks and 40 Crash Safety Shocks. There were no anomalies or performance issues such as flicker in the present invention during these tests.

What is claimed is:

1. A modular display panel for enclosing a light emitting or transmitting display subassembly comprising:
   a base plate;
   a first frame having a first opening, the first frame being attached to the base plate forming a cavity;
   a window attached to the first frame at the first opening enclosing the cavity;
   a second frame having a second opening, the second frame attached to the first frame in the cavity formed by the base plate and the first frame so as to provide a space between the second frame and window and second frame and base;
   a display subassembly attached to the second frame at the second opening; and
   a circuit board with a plurality of light emitting diodes mounted on the circuit board,
   located adjacent to the base plate in the cavity.

2. The modular display panel of claim 1 wherein the first frame comprises metal coated plastic.

3. The modular display panel of claim 1 wherein the first frame comprises metal coated glass filled plastic.

4. The modular display panel of claim 1 wherein the window comprises glass layers.

5. The modular display panel of claim 4 wherein the window further comprises a conductive indium tin oxide layer.

6. The modular display panel of claim 1 further comprising drive electronics, the drive electronics contained within the cavity and electrically connected to the display subassembly.

7. The modular display panel of claim 1 further comprising an EMI shield between the window and the display subassembly.

8. The modular display panel of claim 1 further comprising a diffuser between the plurality of light emitting diodes and the display subassembly.

9. The modular display panel of claim 3 wherein the base plate, the first frame, and the window are all electrically conductive and form a Faraday cage around the display subassembly.

10. The modular display panel of claim 1 wherein the base plate comprises an electrically and thermally conductive material.

11. The modular display panel of claim 10 wherein the first frame comprises an impact resistant electrically and thermally conductive material.

12. A modular display panel for enclosing a light emitting or transmitting display subassembly comprising:
   a base plate of electrically and thermally conductive material;
   a first frame of impact resistant, electrically and thermally conductive material having a first opening attached to the base plate forming a cavity;
   a window with a glass layer, attached to the first frame at the first opening enclosing the cavity;
   a second frame having a second opening, the second frame attached to the first frame in the cavity of the first frame;
   a display subassembly attached to the second frame at the second opening;
   a circuit board, located within the cavity of the first frame; and
   a plurality of light emitting diodes mounted on the circuit board on the side facing the display subassembly.

13. The modular display panel of claim 12 wherein the first frame is a metal coated glass filled plastic.

14. The modular display panel of claim 13 wherein the window comprises a conductive indium tin oxide layer.

15. The modular display panel of claim 14 further comprising drive electronics contained within the cavity of the first frame electrically connected to the display subassembly.

16. The modular display panel of claim 15 further comprising an EMI shield located in the cavity between the window and the plurality of light emitting diodes display subassembly.

17. The modular display panel of claim 16 further comprising a diffuser between the plurality of light emitting diodes and the display subassembly.

18. The modular display panel of claim 16 wherein the base plate, the first frame, and the window form a Faraday cage around the display subassembly.

19. A modular display panel for enclosing a light emitting or transmitting display subassembly comprising:
   a base plate of electrically and thermally conductive material;
   a first frame of metal coated glass filled plastic having a first opening attached to the base plate to form a cavity;
   a window having a glass layer and a conductive indium tin oxide layer attached to the first frame at the first opening for enclosing the cavity, the base plate, the first frame and the window, forming a Faraday cage;
   an indium tin oxide heater and electromagnetic inference shield attached to the underside of the window;
   a second frame having a second opening attached to the first frame and, located in the cavity, so as to allow space between the second frame and window and second frame and base;
   a display subassembly attached to the second frame at the second opening;
   a circuit board adjacent with a plurality of light emitting diodes mounted on the circuit board, on the side facing the display subassembly, located within the cavity adjacent the display subassembly;
   drive electronics contained within the cavity and electrically connected to the display subassembly; and
   a diffuser between the display subassembly and the plurality of light emitting diodes.

* * * * *